(12) United States Patent
Chen et al.

(10) Patent No.: US 7,323,259 B2
(45) Date of Patent: Jan. 29, 2008

(54) MULTILAYER PERPENDICULAR MEDIA WITH HIGH-BORON OR HIGH-CARBON ADDITIVES TO COCR FILMS

(75) Inventors: Qixu Chen, Milpitas, CA (US); Charles Brucker, Pleasanton, CA (US); Rajiv Yadav Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 298 days.

(21) Appl. No.: 10/402,772

(22) Filed: Mar. 28, 2003

(65) Prior Publication Data

US 2005/0037237 A1    Feb. 17, 2005

Related U.S. Application Data

(60) Provisional application No. 60/368,601, filed on Mar. 29, 2002.

(51) Int. Cl.
  *G11B 5/66* (2006.01)
  *G11B 5/70* (2006.01)
(52) U.S. Cl. .................... 428/828.1; 428/832.1; 428/834; 428/836.1
(58) Field of Classification Search ........... 428/828, 428/828.1, 833, 834, 836.1, 832.1
  See application file for complete search history.

(56) References Cited

U.S. PATENT DOCUMENTS

| | | | |
|---|---|---|---|
| 5,061,537 | A | 10/1991 | Kobayashi et al. |
| 5,618,448 | A | 4/1997 | Kuroe et al. |
| 5,846,628 | A | 12/1998 | Kuroe et al. |
| 6,143,388 | A | 11/2000 | Bian et al. |
| 6,475,611 | B1 * | 11/2002 | Chen .................. 428/213 |
| 6,524,730 | B1 * | 2/2003 | Chen .................. 428/811.3 |
| 6,596,418 | B2 * | 7/2003 | Maesaka et al. ...... 428/819.1 |

(Continued)

FOREIGN PATENT DOCUMENTS

JP    59-129934 A   *  7/1984

(Continued)

OTHER PUBLICATIONS

Y. Kubota et al.: "Development of CoX/Pd Multilayer Perpendicular Magnetic Recording Media With Granular Seed Layers" Journal of Magnetism and Magnetic Materials., vol. 242-245, Apr. 2002, pp. 297-303, XP004358683 Elsevier Science Publishers, Amsterdam, NL ISSN: 0304-8853.

*Primary Examiner*—Holly Rickman
(74) *Attorney, Agent, or Firm*—Darby & Darby, P.C.

(57) ABSTRACT

Carbon or boron is added into the CoCr layers of a multi-player perpendicular magnetic media structure to reduce media noise. The perpendicular magnetic media structure has sharp interfaces between Co-alloy layers and Pd or Pt layers and significantly reduced exchange coupling. In accordance with one embodiment of the invention, the perpendicular magnetic media structure with carbon or boron additives is 700 Å $FeCo_{30.8}B_{12}$/20 Å $TaO_x$/700 Å $FeCo_{30.8}B_{12}$/20 Å $TaO_x$/700 Å $FeCo_{30.8}B_{12}$/20 Å $TaO_x$/158 Å $FeCo_{30.8}B_{12}$/17 Å Ta/49 Å ITO/33 Å $CoCr_{37}Ru_{10}$/2.5 Å $CO_y$/2.5 Å C/[$(CoCr_9)C_{6.8}$/Pd]$_{19}$/50 Å CHN. [$(CoCr_9)C_{6.8}$/Pd]$_{19}$ means 19 layers of the bi-layer stack $(CoCr_9)C_{6.8}$/Pd. $TaO_x$ stands for surface-oxidized Ta and $CO_y$ stands for C oxides. ITO stands for Indium Tin Oxide and consists of $In_2O_3$ and $Sn_2O_5$ at 80 and 20 molecular percent respectively. CHN refers to hydrogenated and nitrogenated carbon.

16 Claims, 9 Drawing Sheets

U.S. PATENT DOCUMENTS

| | | | |
|---|---|---|---|
| 6,677,051 B1 * | 1/2004 | Acharya et al. | 428/831.2 |
| 6,764,757 B1 * | 7/2004 | Wu et al. | 428/835.4 |
| 6,893,542 B1 * | 5/2005 | Chen | 204/192.2 |
| 2002/0037439 A1 | 3/2002 | Litvinov et al. | |

FOREIGN PATENT DOCUMENTS

| | | |
|---|---|---|
| JP | 5012646 | 1/1993 |
| JP | 2001176047 | 6/2001 |

* cited by examiner

MULTILAYER PERPENDICULAR MEDIA WITH HIGH-BORON OR HIGH-CARBON ADDITIVES TO COCR FILMS

This application claims priority from U.S. provisional application Ser. No. 60/368,601 filed on Mar. 29, 2002.

BACKGROUND OF THE INVENTION

1. Field of the Invention

The present invention relates generally to the field of disc drive storage, and more particularly to multilayer perpendicular magnetic media.

2. Description of the Related Art

Conventional disc drives are used to magnetically record, store and retrieve digital data. Data is recorded to and retrieved from one or more discs that are rotated at more than one thousand revolutions per minute (rpm) by a motor. The data is recorded and retrieved from the discs by an array of vertically aligned read/write head assemblies, which are controllably moved from data track to data track by an actuator assembly.

The three major components making up a conventional hard disc drive are magnetic media, read/write head assemblies and motors. Magnetic media, which is used as a medium to magnetically store digital data, typically includes a layered structure, of which at least one of the layers is made of a magnetic material, such as CoCrPtB, having high coercivity and high remnant moment. The read/write head assemblies typically include a read sensor and a writing coil carried on an air bearing slider attached to an actuator. This slider acts in a cooperative hydrodynamic relationship with a thin layer of air dragged along by the spinning discs to fly the head assembly in a closely spaced relationship to the disc surface. The actuator is used to move the heads from track to track and is of the type usually referred to as a rotary voice coil actuator. A typical rotary voice coil actuator consists of a pivot shaft fixedly attached to the disc drive housing closely adjacent to the outer diameter of the discs. Motors, which are used to spin the magnetic media at rates of higher than 1,000 revolutions per minute (rpm), typically include brushless direct current (DC) motors. The structure of disc drives is well known.

Magnetic media can be locally magnetized by a read/write head, which creates a highly concentrated magnetic field that alternates direction based upon bits of the information being stored. The highly concentrated localized magnetic field produced by the read/write head magnetizes the grains of the magnetic media at that location, provided the magnetic field is greater than the coercivity of the magnetic media. The grains retain a remnant magnetization after the magnetic field is removed, which points in the same direction of the magnetic field. A read/write head that produces an electrical response to a magnetic signal can then read the magnetization of the magnetic media.

Magnetic media structures are typically made to include a series of thin films deposited on top of aluminum substrates, ceramic substrates or glass substrates. FIG. 1 illustrates a conventional magnetic media structure having a substrate 110, a first layer 112 made of CoFeB, a second layer 114 made of Ta or $TaO_x$, a third layer 116 made of CoFeB, a fourth layer 118 made of Ta or $TaO_x$, a fifth layer 120 made of CoFeB, a sixth layer 122 made of Ta or $TaO_x$, a seventh layer 124 made of CoFeB, an eighth layer 126 made of Ta, a ninth layer 128 made of Indium Tin Oxide (ITO), a tenth layer 130 made of CoCrRu, an eleventh layer 132 made of boron-oxide ($BO_z$), a twelfth layer 134 made of B, a thirteenth layer 136 made of nineteen bi-layers having CoCr/Pd, and a fourteenth layer 138 made of hydrogenated and/or nitrogenated carbon (CHN).

Substrate 110 is typically made of Aluminum (Al), nickel-phosphorus plated aluminum, glass or ceramic. Although all of the layers contribute to the magnetic properties of the stack, the thirteenth layer 136, which is made out of the nineteen bi-layers CoCr/Pd, plays an important role in making a magnetic media stack with desirable magnetic recording properties.

The magnetic media structure described with reference to FIG. 1 above is made using conventional magnetic media manufacturing processes. Conventional media manufacturing processes include texturing substrate 110, cleaning substrate 110, and depositing layers 112 through 138. The deposition process includes sputtering target material of usually the same material as their respective layers so that thin films of the sputtered material grow on the substrate. The deposition process is usually done at ambient temperatures and only after the deposition chamber has been evacuated to low pressures. Multilayer perpendicular media is typically deposited under ambient temperature for sharp interfaces between Co and Pd/Pt layers.

The magnetic layers of the alloy perpendicular or longitudinal recording media, which include a single or a couple of magnetic layers wherein the thickness of each layer can range from about 10 Å to about several hundred angstroms, are typically deposited onto substrates that have been heated to high temperatures, such as 250° C. Growing thin films on hot substrates reduces noise by promoting desired crystallographic orientations and by enhancing Cr segregation into grain boundaries. During deposition, the higher substrate temperature enhances molecule mobility permitting desired crystallographic orientations to grow and enhancing Cr segregation into grain boundaries reduces exchange coupling of the grains reducing noise.

The magnetic media structure of FIG. 1 lacks optimal magnetic properties because of high noise resulting from high magnetic exchange coupling between grains. The requirement to have sharp interfaces between different layers while having a laminated alternative thin layer structure consisting of Co-alloy and Pd or Pt that is different from conventional alloy media, makes it desirable to find ways to reduce the exchange coupling of multilayer perpendicular media and maintain sharp interfaces between Co-alloy and Pd or Pt films. This is especially true for the media deposited at ambient temperature. Therefore what is needed is a magnetic media structure with high magnetic anisotropy of the multilayer media, sharp interfaces between the Co-alloy films and the Pd or Pt films that reduces noise that can be deposited at ambient temperatures.

SUMMARY OF THE INVENTION

This limitation is overcome by incorporating carbon or boron additives into a multilayer perpendicular magnetic media structure. In accordance with one embodiment of the invention, carbon or boron additives are added into CoCr alloy films of the multilayer perpendicular magnetic media structure. The resulting perpendicular magnetic media structure has sharp interfaces and significantly reduced exchange coupling. One possible reason for the decoupling is that the matrix materials at the grain boundaries of the Co-alloy films have much higher concentration of Cr, B, or C than those inside the grains. The Cr, B, or C-rich glass-like matrix significantly reduces granular exchange coupling. Chromium segregation is much enhanced by boron or carbon.

In accordance with one embodiment of the invention, the perpendicular magnetic media structure with carbon or boron additives includes a substrate, a CoFeB layer, a Ta or $TaO_x$ layer, a second CoFeB layer, a second Ta or $TaO_x$ layer, a third CoFeB layer, a third Ta or $TaO_x$ layer, a fourth CoFeB layer, a Ta layer, an Indium Tin Oxide (ITO) layer, a CoCrRu layer, a boron-oxide layer, a boron layer, a set of nineteen CoCrB/Pd bi-layers, and a hydrogenated and/or nitrogenated carbon (CHN) protective overcoat.

One such perpendicular magnetic media structure is 700 Å $FeCo_{30.8}B_{12}$/20 Å $TaO_x$/700 Å $FeCo_{30.8}B_{12}$/20 Å $TaO_x$/700 Å $FeCo_{30.8}B_{12}$/20 Å $TaO_x$/158 Å $FeCo_{30.8}B_{12}$/17 Å Ta/49 Å ITO/33 Å $CoCr_{37}Ru_{10}$/2.5 Å $CO_y$/2.5 Å C/[$(CoCr_9)C_{6.8}$/Pd]$_{19}$/50 Å CHN. [$(CoCr_9)C_{6.8}$/Pd]$_{19}$ means 19 layers of the bi-layer stack $(CoCr_9)C_{6.8}$/Pd. $TaO_x$ stands for surface-oxidized Ta. $CO_y$ stands for C oxides. ITO stands for Indium Tin Oxide and consists of $In_2O_3$ and $Sn_2O_5$ at 80 and 20 molecular percent respectively. CHN refers to hydrogenated and nitrogenated carbon.

Other embodiments of the perpendicular magnetic media structure can include various thicknesses and compositions.

BRIEF DESCRIPTION OF THE INVENTION

DETAILED DESCRIPTION OF THE PREFERRED EMBODIMENTS

The invention provides a system and method for high areal density magnetic recording using multilayer perpendicular magnetic media having significantly reduced medium noise.

Figure 2:
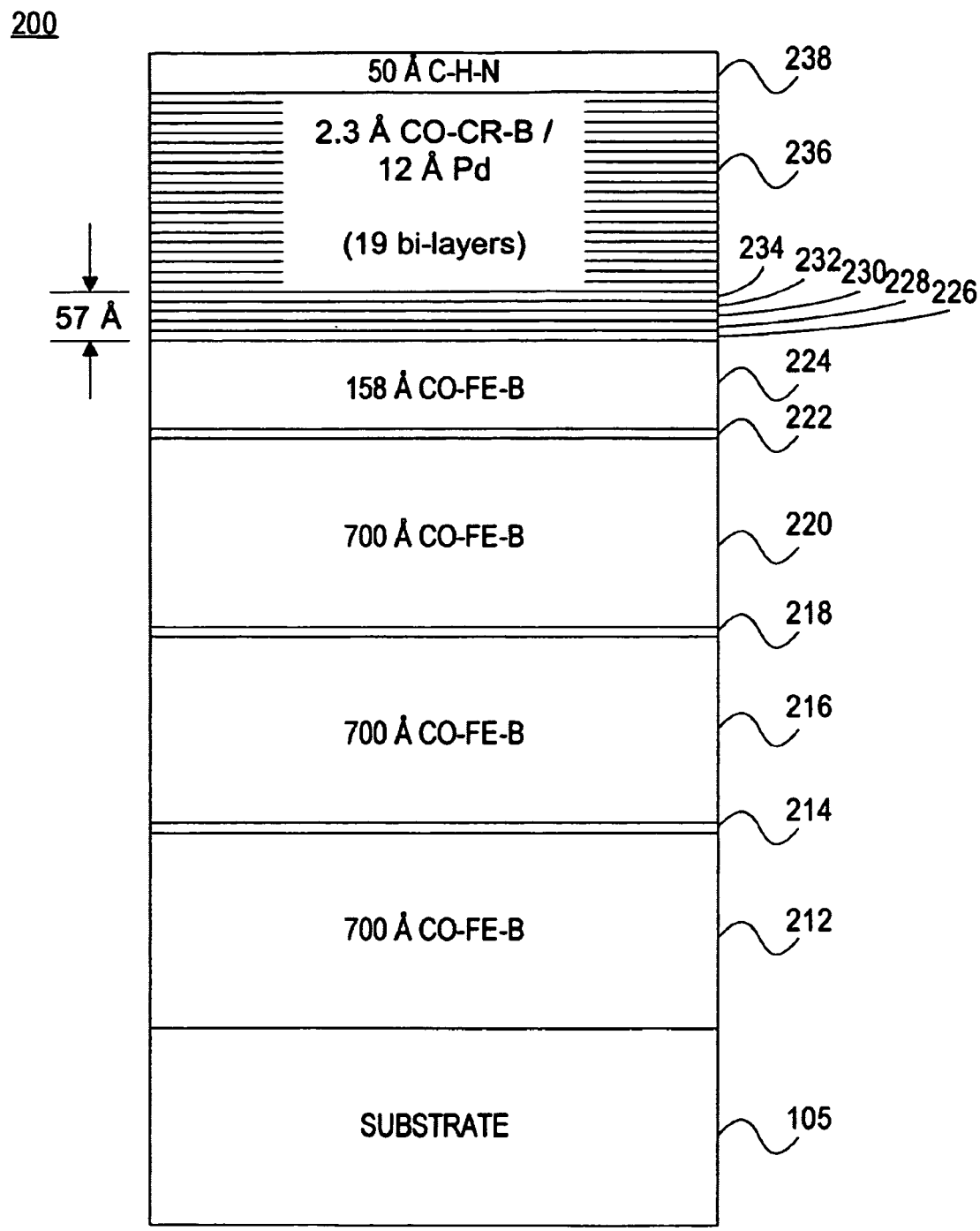
FIG. 2 is a block diagram showing a multilayer perpendicular magnetic media structure having a CoCr alloy film with boron additives in accordance with one embodiment of the invention.

FIG. 2 illustrates a multilayer perpendicular magnetic media structure 200 having CoCr films containing boron (B) additives to reduce medium noise, in accordance with one embodiment of the invention. Perpendicular magnetic media structure 200 includes a substrate 110, a first layer 212 made of approximately 700 Å CoFeB, a second layer 214 made of approximately 20 Å Ta or $TaO_x$, a third layer 216 made of approximately 700 Å CoFeB, a fourth layer 218 made of approximately 20 Å Ta or $TaO_x$, a fifth layer 220 made of approximately 700 Å CoFeB, a sixth layer 222 made of approximately 20 Å Ta or $TaO_x$, a seventh layer 224 made of approximately 158 Å CoFeB, an eighth layer 226 made of approximately 10 Å Ta, a ninth layer 228 made of approximately 21 Å Indium Tin Oxide (ITO), a tenth layer 230 made of approximately 21 Å CoCrRu, an eleventh layer 232 made of approximately 2.5 Å boron-oxide ($BO_z$), a twelfth layer 234 made of approximately 2.5 Å B, a thirteenth layer 236 made of nineteen bi-layers of approximately 2.3 Å CoCrB/12 Å Pd, and a fourteenth layer 238 made of approximately 50 Å of hydrogenated and/or nitrogenated carbon (CHN). In an alternative embodiment the boron (B) can be substituted with carbon (C). Perpendicular magnetic media structure 200 has high magnetic anisotropy and sharp interfaces between the Co-alloy films and the Pd or Pt films that reduces noise that can be deposited at ambient temperatures.

In one embodiment, the perpendicular magnetic media structure 200 is 700 Å $FeCo_{30.8}B_{12}$/20 Å $TaO_x$/700 Å $FeCo_{30.8}B_{12}$/20 Å $TaO_x$/700 Å $FeCo_{30.8}B_{12}$/20 Å $TaO_x$/158 Å $FeCo_{30.8}B_{12}$/17 Å Ta/49 Å ITO/33 Å $CoCr_{37}Ru_{10}$/2.5 Å $CO_y$/2.5 Å C/[$(CoCr_9)C_{6.8}$/Pd]$_{19}$/50 Å CHN. [$(CoCr_9)C_{6.8}$/Pd]$_{19}$ means 19 layers of the bi-layer stack $(CoCr_9)C_{6.8}$/Pd. The first $CoCr_9$ layer is deposited prior to first Pd deposition. $TaO_x$ stands for surface-oxidized Ta. $CO_y$ stands for C oxides. ITO stands for Indium Tin Oxide and consists of $In_2O_3$ and $Sn_2O_5$ at 80 and 20 molecular percent respectively. CHN refers to hydrogenated and nitrogenated carbon. The Co-alloy and Pd film thickness is 2 and 10 Å respectively. Although precise atomic percentages and thicknesses are given in this embodiment, actual values can vary. The tolerances for making a working magnetic media structure 200 are fairly large.

Substrate 110 of perpendicular magnetic media structure 200 is a non-magnetic material sufficiently thick to provide sufficient rigidity. Substrate 110 can be made out of Aluminum (Al), nickel-phosphorus plated aluminum, Al—Mg based alloys, other aluminum based alloys, other non-magnetic metals, other non-magnetic alloys, glass, ceramic, polymers, glass-ceramics, and composites and/or laminates thereof. The CoFeB 212 layer is magnetically soft magnetic material whereas the Ta or $TaO_x$ layers 214, 218 and 222 are the non-magnetic spacers, which can be surface-oxidized Ta or non-oxidized Ta. The alternating CoFeB and Ta or $TaO_x$ layers (212-224) make up the soft magnetic underlayer. The total thickness of the soft magnetic underlayer is in the range between 1000 and 4000 Å. Other soft magnetic materials that can be used include Ni, NiFe, CoFeB, CoFeC, CoFeZr, Co, CoZr, CoZrCr, CoZrNb, CoTaZr, CoFe, Fe, FeTaN, FeAlN, FeTaC, FeSiAlN, FeSiAl, and FeN. Similarly other non-magnetic spacers can be used as is well know in the art. The boron layer 234, boron oxide layer 232, CoCrRu layer 230,ITO layer 228 and Ta layer 226 are referred to as a non-magnetic interlayer and can be substituted for other non-magnetic interlayers known in the art. The total thickness of interlayers is in the range between 10 and 200 Å. In alternative embodiments, the CoCrRu layer can include CoCrX where is selected from the group consisting of Ru, Pt, Ta, Mo, B, Si, Ge, Nb, and W. The CoCrRu layer is typically a non-magnetic material with high Cr content such as 37 atomic percent. The thickness of carbon overcoat is in the range between 20 and 100 Å.

Figure 1:
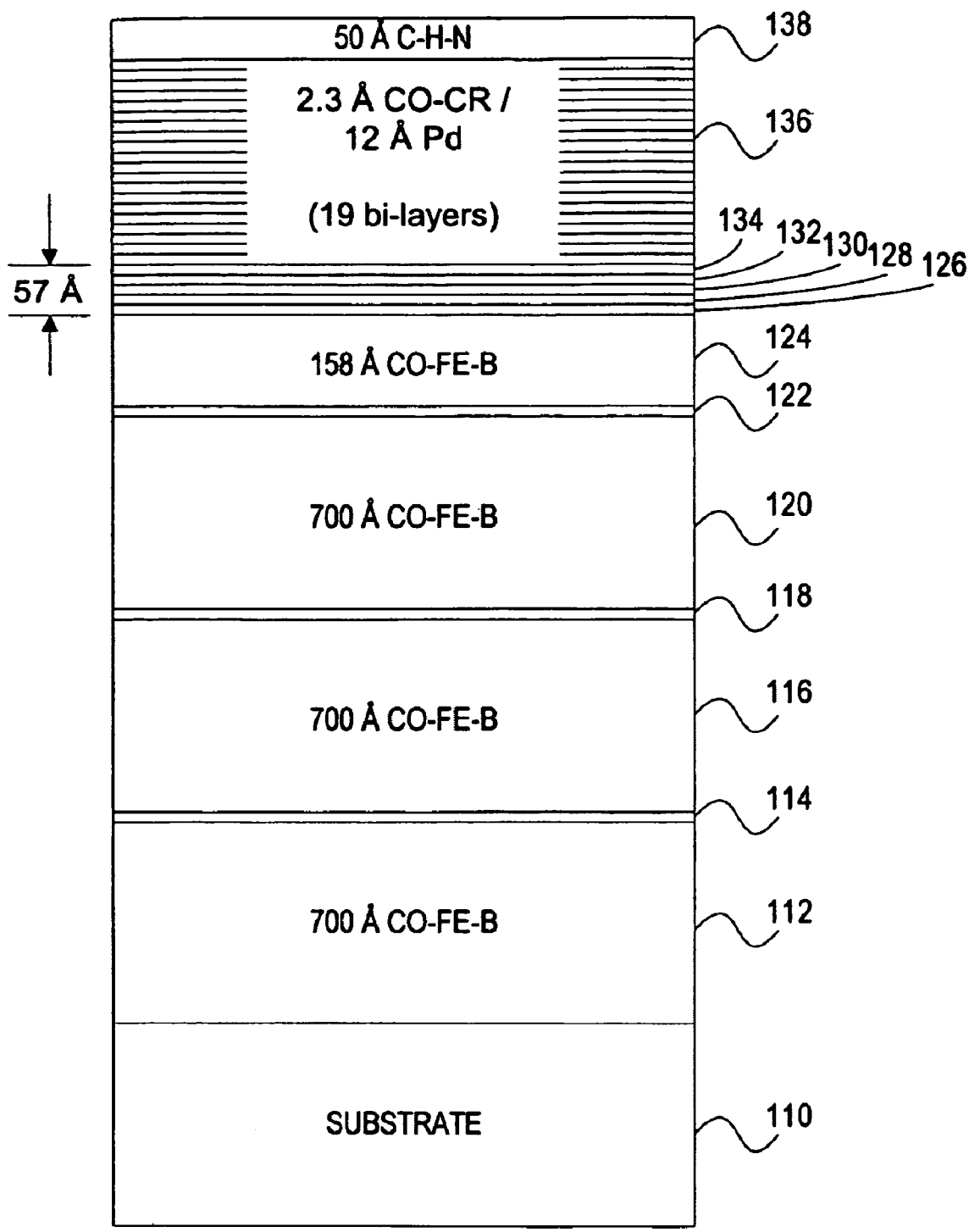
FIG. 1 is a block diagram showing a prior art conventional multilayer perpendicular magnetic media structure.

Although perpendicular magnetic media structure 200 is the prior art structure, described with reference to FIG. 1, with carbon or boron additives to the CoCr, perpendicular magnetic media structure 200 advantageously has sharp interfaces and significantly reduced exchange coupling.

Although the exact reason for the decoupling is not certain, one theory is that the matrix materials at the grain boundaries of the Co-alloy films have much higher concentrations of Cr, B, or C than those inside the grains. The Cr, B, or C-rich glass-like matrix significantly reduces granular exchange coupling. Boron and carbon additives additionally cause chromium segregation, which can produce favorable film properties.

Other embodiments of perpendicular magnetic media structure 200 include bi-layers that are CoCrC/Pd, CoCrB/Pd, CoCrC/Pt, and CoCrB/Pt. Either layer of the bi-layers can be deposited first. Additionally, once a bi-layer is selected a number of these bi-layers, denoted as "n," are stack on top of each other to form a superlattice structure. Although there is no restriction on the number n except that it is an integer, the number of bi-layers (n) is typically in the range of 1 to 25. However, n can be optimized for a particular application wherein specific magnetic properties are needed, as is known by those skilled in the art. The superlattice structure made up of n bi-layer is the recording layer because it is the layer of perpendicular magnetic media structure 200 wherein information is stored. The thickness of each CoCrB or CoCrC layer is in the range between 1 and 4 Å. The thickness of each Pd or Pt layer is in the range between 6 and 14 Å. The atomic percent of boron or carbon is in the range between 4 and 30. The atomic percent of Cr is in the range between 5 and 23.

Figure 3:
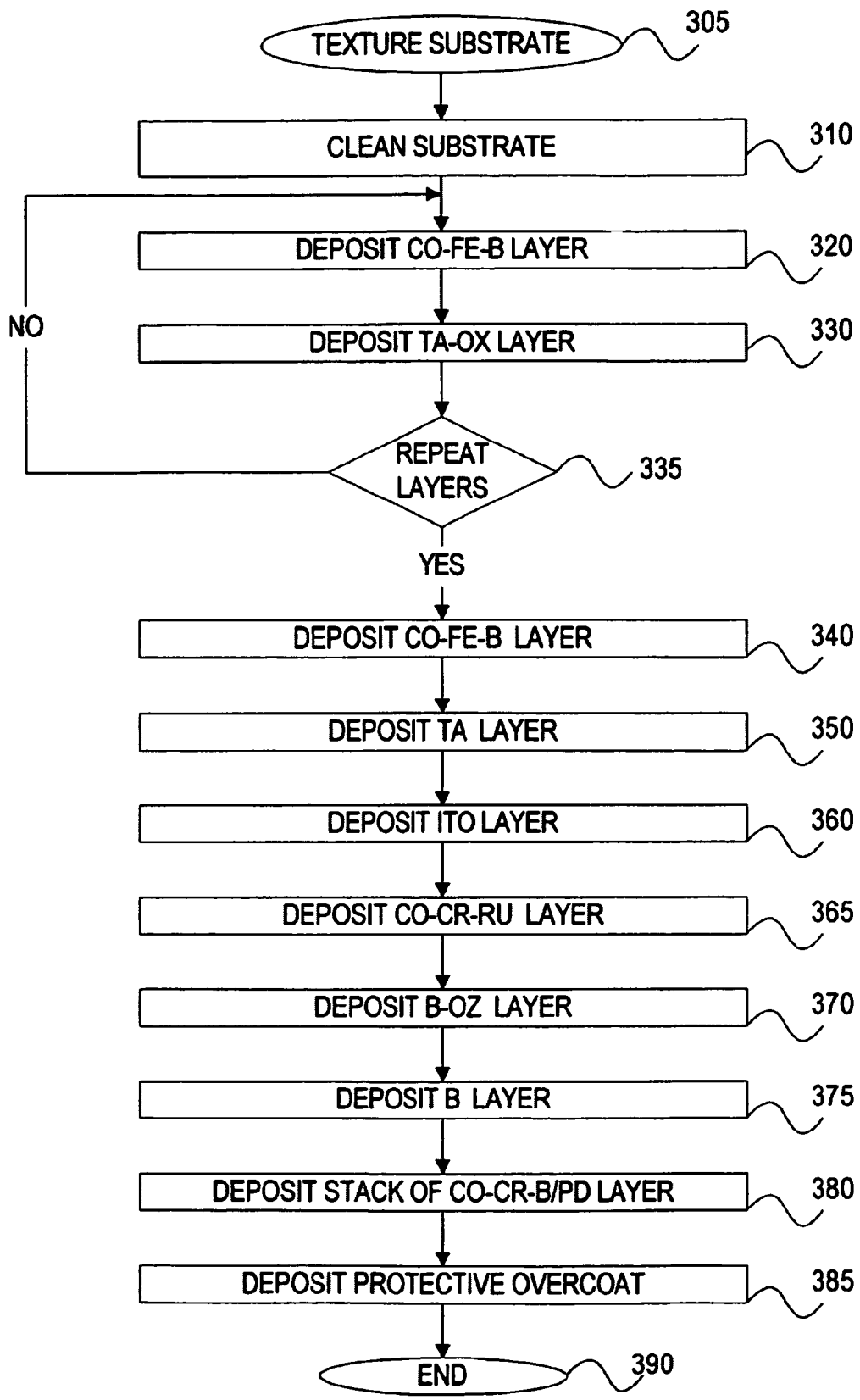
FIG. 3 is a flowchart illustrating the preferred method of making magnetic media structure 200.

FIG. 3 is a flowchart illustrating the preferred method of making perpendicular magnetic media structure 200. First in step 305 a substrate 110 is textured prior to cleaning. In step 305, the glass substrate is textured/polished, using conventional mechanical polishing processes, to have a surface roughness of less than 50 Å. Next in step 310 the substrate is cleaned using a conventional glass cleaning procedure-involving combinations of acids, detergents, alcohol, solvents and water. This step cleans the substrate 110 of any residue left over from the texturing/polishing process and prepares the substrate 110 for the subsequent thin film deposition process. In step 320, the CoFeB layer is deposited onto the substrate creating an amorphous CoFeB layer on the substrate. Typically the CoFeB layer is sputter deposited onto the substrate using conventional thin film growth techniques and a single target made out of the appropriate alloy CoFeB. Adjusting the power and/or adjusting the sputtering time controls the thickness, which is approximately 700 Å in this application. Since the CoFeB is typically sputter deposited, the substrate is loaded into a vacuum deposition apparatus after it is cleaned in step 310 and before the CoFeB layer 212 is deposited in step 320.

Next in step 330 the Ta layer 214 is deposited onto the CoFeB layer 212. The Ta layer is deposited in the same deposition apparatus as the CoFeB was deposited and is usually accomplished by moving the substrate in front of a Ta target or moving the Ta target in front of the substrate and striking a plasma resulting in the deposition of the Ta layer 214 on the CoFeB layer 212. The surface of Ta film can be oxidized in a gas mixture of Ar and oxygen or by unloading the samples to atmosphere and loading the samples into vacuum chamber again for repeating the deposition of CoFeB. When using vacuum deposition apparatus' that do not have sufficient target/stations to deposit the CoFeB/Ta/CoFeB/Ta/CoFeB/Ta stack, it may be necessary to deposit the CoFeB/Ta layer, unload the substrate with the CoFeB/Ta layer, and load it back into the deposition apparatus for nest deposition of CoFeB/Ta. When the substrate with the CoFeB/Ta layer is unloaded from the vacuum chamber the Ta is surface-oxidized. The surface oxidation of Ta is not necessary from the point of view of magnetic properties. In alternative applications it may be desirable to etch off the surface of the CoFeB/Ta layer to control the amount of oxidation after the substrate with the CoFeB/Ta layer is loaded back into the vacuum deposition apparatus and before the subsequent CoFeB/Ta layer is deposited.

Next in step 335 a decision is made as to whether steps 320 and 330 need to be repeated. In this embodiment steps 320 and 330 are repeated twice each, so that layers 216, 218, 220 and 222 are deposited. If the decision in step 335 is to repeat the layers then steps 320 and 330 are deposited again and if the decision is not to repeat then the process continues on to step 340. In step 340 and step 350, 158 Å of CoFeB and 17 Å Ta are deposited respectfully, using the same apparatus and similar procedures as used in steps 320 and 330. Next in step 360, the Indium Tin Oxide (ITO) layer 228 is deposited using similar processes as were used in steps 330 through 340. Similarly, in step 365 the CoCrRu layer 230 is deposited, in step 370 $BO_z$ layer 232 is deposited, and in step 375 the boron layer 234 is deposited. The BOz film can be grown by sputter depositing boron in an environment containing oxygen.

Next in step 380, the stack of alternating CoCrB/Pd layers 236 is deposited onto of boron layer 234. In one embodiment, this stack includes nineteen bi-layers of approximately 2.3 Å CoCrB/12 Å Pd. This stack can be deposited in a variety of ways including repeatedly moving the substrate in from of a CoCrB target and a Pd target while they are being sputtered so that the stack of alternating layers is built up. This stack can also be deposited with by alternatively firing two concentric ring type targets of CoCrB and Pd. In step 385, a protective overcoat layer made of CHN 238 is deposited over the stack of CoCrB/Pd layers 236. CHN 238 layer consists of carbon with hydrogen and nitrogen that is deposited directly after deposition of the previous deposited magnetic layers while the substrate remains under vacuum. CHN 238 layer is deposited by transferring the substrate with thin films, while being kept under vacuum, to an adjacent chamber that is isolated from the chambers used to deposit the previous layers. Additionally, CHN 238 layer is deposited in an isolated chamber because reactive gasses containing hydrogen or nitrogen can be used in the deposition process. If step 385 is not done in an isolated chamber then there is a likelihood that the reactive gasses can contaminate adjacent targets. Finally in step 390 the vacuum deposition process ends by moving the sputtered perpendicular magnetic media structure 200 into a load/unload lock and unloading, the magnetic media structure 200 from the vacuum chamber.

Although the above-mentioned process was done using a commercial single disk processing system such as the Circulus sputter machine from Unaxis, Germany, it can be done with a variety of different thin film deposition tools. Additionally, other thin film deposition processes including but not limited to plasma sputter deposition, ion beam deposition, chemical vapor deposition and reactive ion sputtering can be used to make perpendicular magnetic media structure 200. Finally, in accordance with one embodiment of the invention, perpendicular magnetic media structure 200 was made by magnetron sputtering appropriate targets at ambient temperature.

Figure 4:
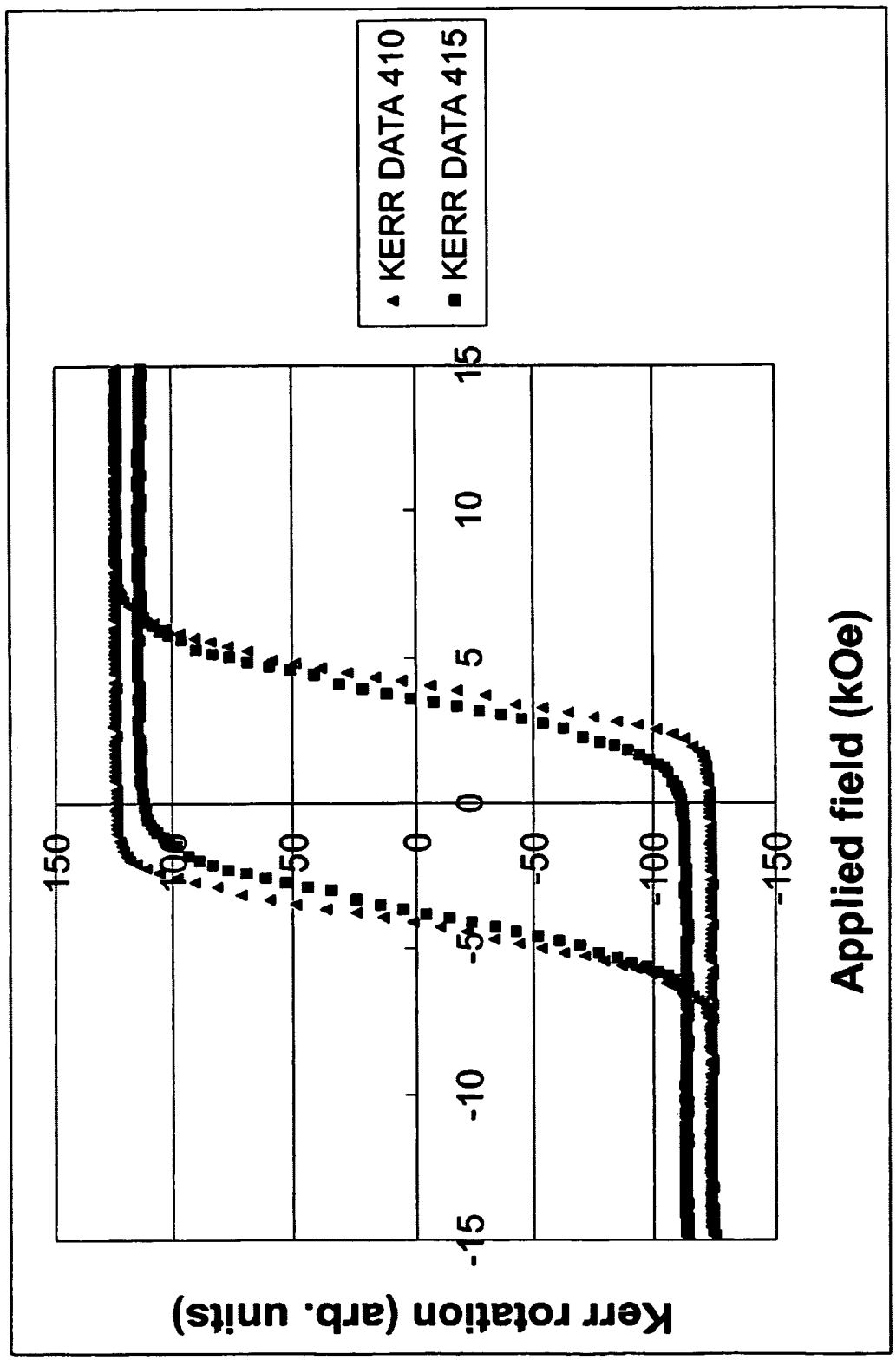
FIG. 4 is a graph showing the magneto-optical Kerr effect as a function of applied magnetic field for CoCr/Pd multilayer media with and without carbon additives in the CoCr layers.

FIG. 4 is a graph comparing magneto-optical Kerr data as a function of applied magnetic field (hereinafter referred to as Kerr Data), for perpendicular magnetic media structure 200, with and without carbon additives. More specifically, first Kerr Data 410 is for perpendicular magnetic media structure 200 having a thirteenth layer further containing a stack of nineteen carbon containing layers (CoCrC/Pd) whereas second Kerr Data 415 is for perpendicular magnetic media structure 200 having a thirteenth layer further containing a stack of nineteen non-carbon containing layers (CoCr/Pd). First Kerr Data 410 is a hysterisis loop for the perpendicular magnetic media structure 200, containing a series of CoCrC/Pd stacks, having a coercivity (Hc) of approximately 3660 Oe and a nucleation field (Hn) of approximately −1902 Oe. Second Kerr Data 415 is a hysterisis for the perpendicular magnetic media structure 200, containing a series of CoCr/Pd stacks having a coercivity (Hc) of approximately 4100 Oe and a nucleation field (Hn) of approximately −2521 Oe. FIG. 4 demonstrates that CoCrC/Pd medium has a reasonably high negative nucleation field Hn and a reasonably high coercivity Hc while having a smaller alpha (α) than the CoCr/Pd medium. Alpha (α) is defined by the following equation:

$$\alpha = 4\pi (dM/dH)_{Hc},$$

where M is the magnetic moment of the medium and H is applied magnetic field. Alpha (α) can be used to predict the noise behavior of a media. Since a reasonably smaller alpha (α) leads to less medium noise, a reasonably smaller (α) is desired in a finished medium.

Figure 5:
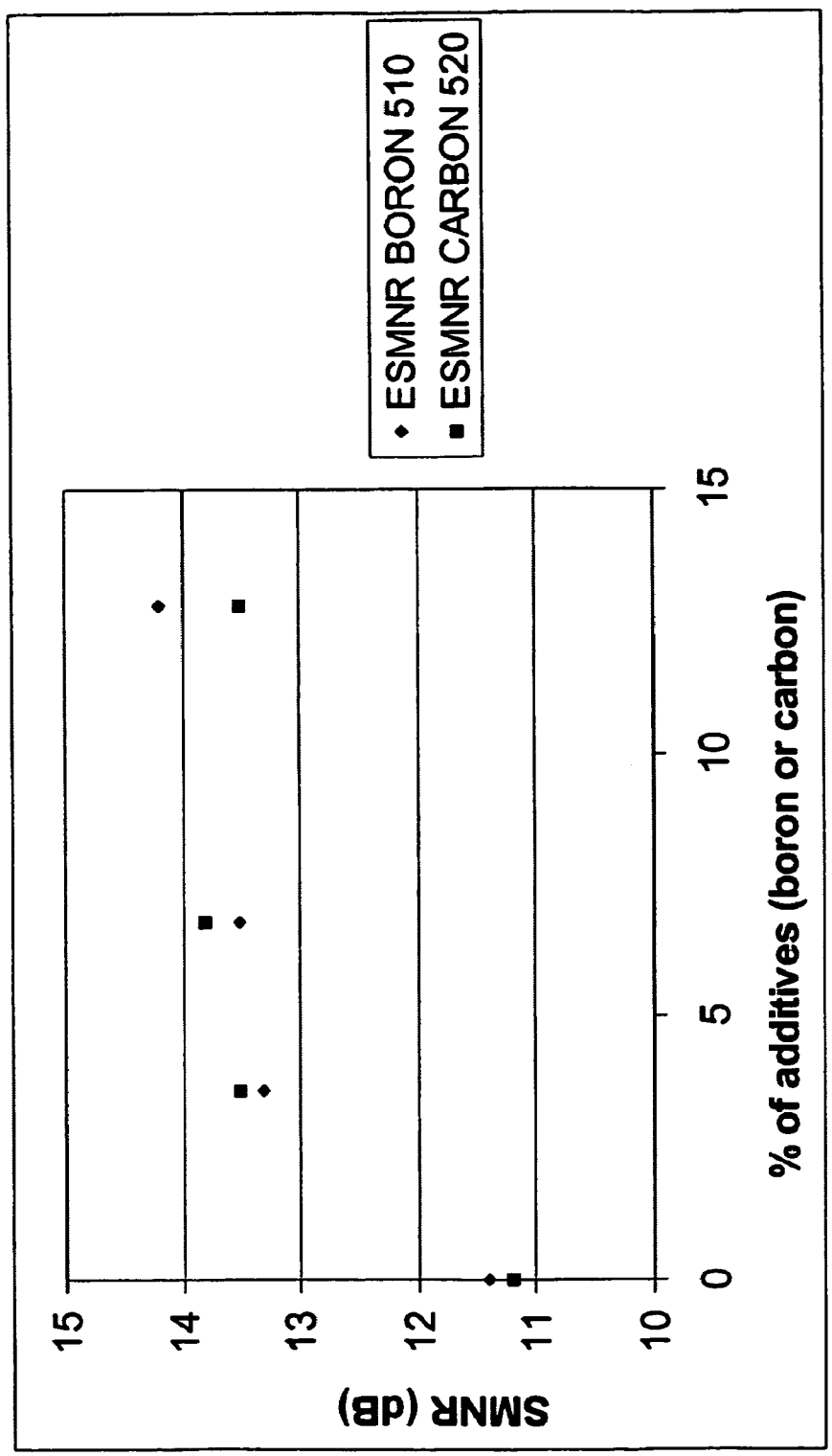
FIG. 5 is a graph showing the medium signal-to-noise ratio (SMNR) dependence on boron and carbon concentration in the multilayer perpendicular media.

FIG. 5 is a graph showing the medium signal-to-noise ratio (SMNR) dependence on boron and carbon concentration in the perpendicular magnetic media structure 200. FIG. 5 data shows perpendicular magnetic media structure 200 with varying concentrations of boron and carbon additives. In FIG. 5, Boron SMNR Data 510 shows SMNR data for perpendicular magnetic media structure 200 containing boron additives whereas Carbon SMNR Data 520 shows SMNR data for perpendicular magnetic media structure 200 containing carbon additives. Perpendicular magnetic media structure 200 with boron additives is the same as with carbon additives except that carbon is replaced with boron in all layers except the CHN overcoat. Both Boron SMNR Data 510 and Carbon SMNR Data 520 show that magnetic media structure 200 with high boron or carbon additives have much higher SMNR than media without additives. FIG. 5 shows that Boron SMNR Data 510 for perpendicular magnetic media structure 200 increases from approximately 11.3 dB for no boron additives to approximately 13.5 dB for about 7% boron additives. Additionally, FIG. 5 shows that Carbon SMNR Data 520 for perpendicular magnetic media structure 200 increases from approximately 11.2 dB for no carbon additives to approximately 13.8 dB for about 7% carbon additives. FIG. 5 also shows that Boron SMNR Data 510 increases to 14.2 dB for approximately 13% boron additives whereas Carbon SMNR Data 520 decreases to about 13.5 dB for about 13% carbon additives.

The recording performances of the perpendicular magnetic media structure 200 were tested with a head having a ring type write element and a Giant Magneto-resistive (GMR) read element that was tested at 500 thousands of flux reversals per inch (kfci).

Figure 6:
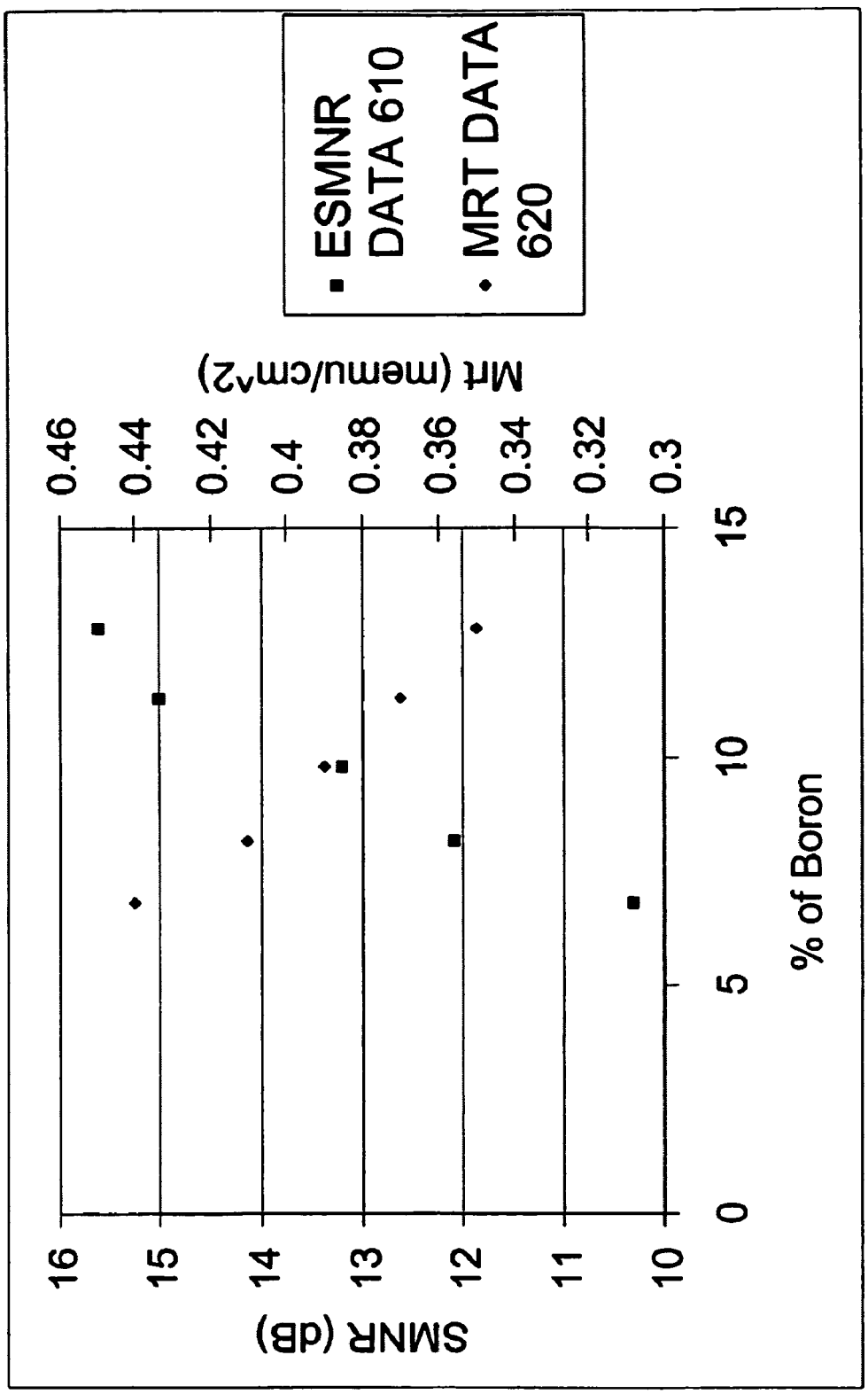
FIG. 6 is a graph showing both the SMNR and MrT dependence on boron concentration of the magnetic media structure 200.

FIG. 6 is a graph showing the medium signal-to-noise ratio (SMNR) and Mrt dependence on boron concentration in perpendicular magnetic media structure 200. Mrt is the product of magnetic remnant moment and thickness of the CoCrB/Pd multilayer stack. The SMNR was measured with a head having a single pole writer and a GMR reader at 500 kfci. The data shown in FIG. 6 was taken for media having CoCrB/Pd multilayer stacks wherein the boron (B) concentration is in the range from 6.8 to 12.8 atomic percentages. The SMNR Data 610 shows that the SMNR increases as the percentage of boron increases. In particular, the SMNR increases from about 10.3 dB for about 6.8 atomic percentage of boron to about 15.7 dB for about 12.8 atomic percentage of boron. The increase in SMNR as a function of increasing boron atomic percentage is close to linear. On the other hand, the Mrt Data 620 shows that the Mrt decreases as the percentage of boron increases. In particular, the Mrt decreases from about 0.44 memu/cm$^2$ for about 6.8 atomic percentage of boron to about 0.35 memu/cm$^2$ for about 12.8 atomic percentage of boron. The decrease in Mrt as a function of increasing boron atomic percentage is also close to linear.

Figure 7:
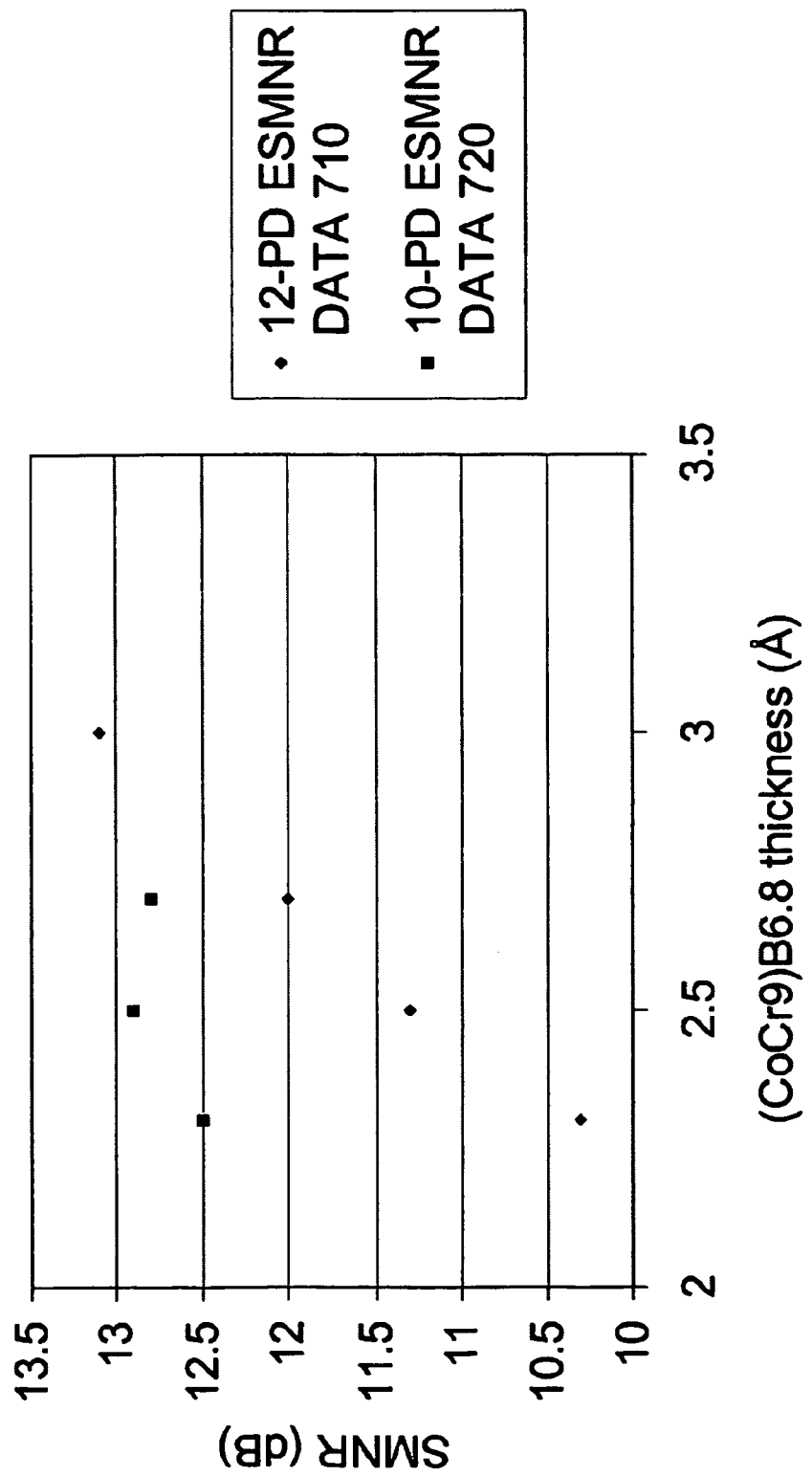
FIG. 7 is a graph showing the SMNR dependence on CoCrB thickness of the magnetic media structure 200 with fixed boron concentration of 6.8 atomic percentages.

FIG. 7 is a graph showing the medium signal-to-noise ratio (SMNR) dependence on CoCrB and Pd thickness with fixed boron concentration of 6.8 atomic percentages for perpendicular magnetic media structure 200 having 12 Å Pd thickness and 10 Å Pd thickness. 12-Pd SMNR Data 710 shows the SMNR dependency on CoCrB thickness for perpendicular magnetic media structure 200 having 12 Å of Pd whereas 10-Pd SMNR Data 720 shows the SMNR dependency on CoCrB thickness for perpendicular magnetic media structure 200 having 10 Å of Pd. The 12-Pd SMNR Data 710 shows that the SMNR increases as the thickness of CoCrB increases. In particular, the SMNR increases from about 10.3 dB when the thickness of CoCrB is about 2.3 Å to about 13.2 dB when the thickness of CoCrB is about 3 Å. The increase in SMNR as a function of increasing CoCrB thickness is close to linear for perpendicular magnetic media structure 200 having 12 Å Pd thickness and fixed boron concentration of 6.8 atomic percentage. On the other hand, 10-Pd SMNR Data 720 shows that the SMNR remains substantially unchanged as the thickness of CoCrB increases for perpendicular magnetic media structure 200 having 10 Å Pd thickness and fixed boron concentration of 6.8 atomic percentage. Specifically, the 10-Pd SMNR Data 720 remains in the range from about 12.5 dB to about 13 dB when the thickness of CoCrB varies from about 2.3 Å to about 3 Å.

Figure 8:
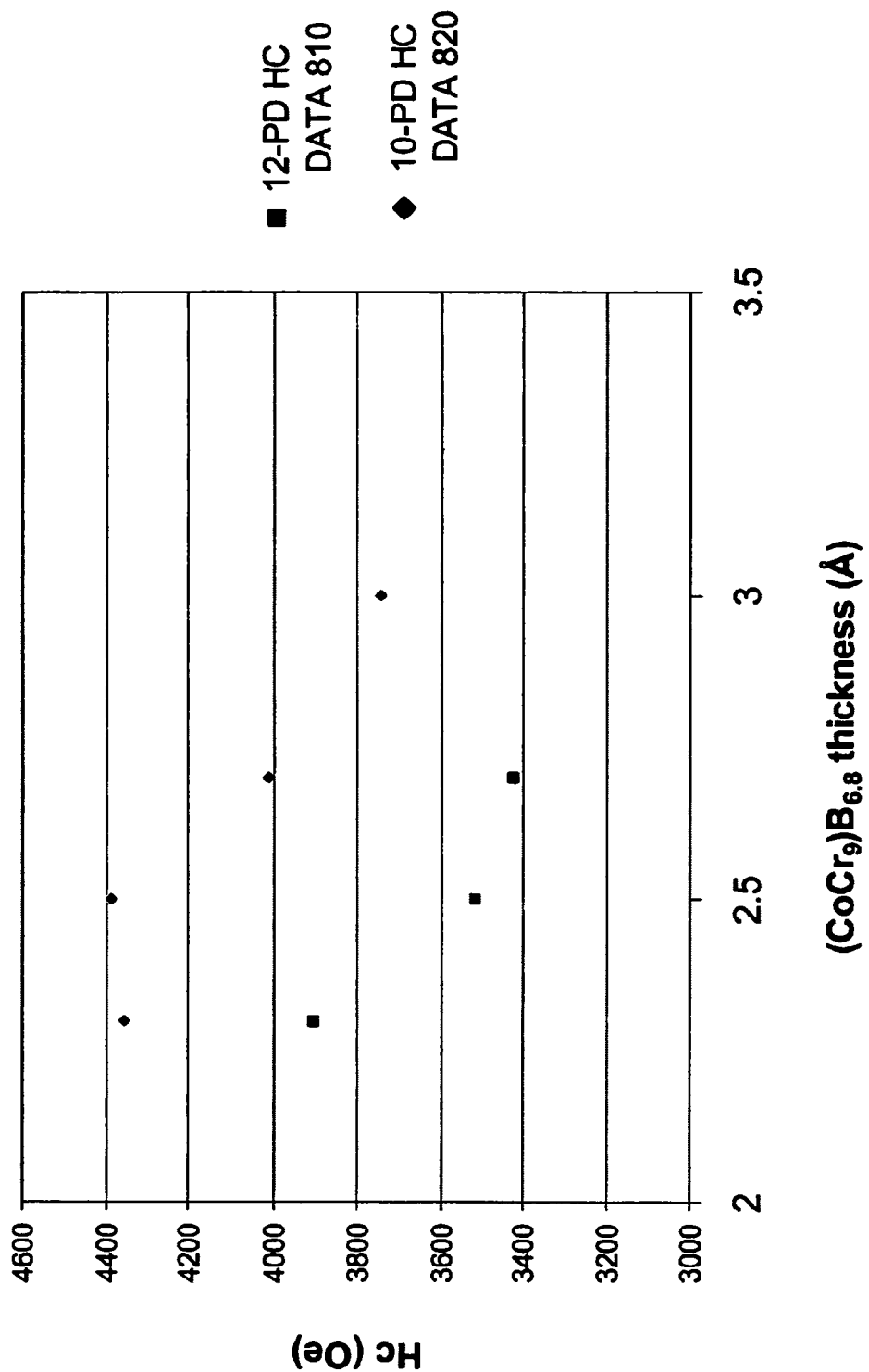
FIG. 8 is a graph showing the coercivity (Hc) dependence on CoCrB thickness of the magnetic media structure 200 with fixed boron concentration of 6.8 atomic percentages.

FIG. 8 is a graph showing the coercivity (Hc) dependence on CoCrB and Pd thickness with fixed boron concentration of 6.8 atomic percentage for perpendicular magnetic media structure 200 having 12 Å Pd thickness and 10 Å Pd thickness. 12-Pd Hc Data 810 shows the coercivity (Hc) dependency on CoCrB thickness for perpendicular magnetic media structure 200 having 12 Å of Pd whereas 10-Pd Hc Data 820 shows the coercivity (Hc) dependency on CoCrB thickness for perpendicular magnetic media structure 200 having 10 Å of Pd. The 12-Pd Hc Data 810 and the 10-Pd Hc Data 820 for perpendicular magnetic media structure 200 shows that the coercivity (Hc) decreases as the thickness of CoCrB increases. In particular, the 10-Pd Hc Data 820 decreases from about 3900 Oe for CoCrB thickness of about 2.3 Å to about 3400 Oe for CoCrB thickness of about 2.7 Å.

FIGS. 6-8 shows data that can be used to establish a process whereby perpendicular magnetic media structure 200 can be made to have desirable SMNR, MrT, and Hc values. FIG. 6 illustrates that high boron concentration reduces the MrT, which can be compensated by increasing the thickness of the CoCrB layer. Additionally, FIG. 7 illustrates that the SMNR can be made to be constant or to increase with increasing CoCrB thickness. Finally FIG. 8 illustrates that the coercivity can be made to decrease with increasing CoCrB thickness. This flexibility allows one to vary the boron concentration and CoCrB thickness to achieve desirable SMNR, MrT, and He values.

Figure 9:
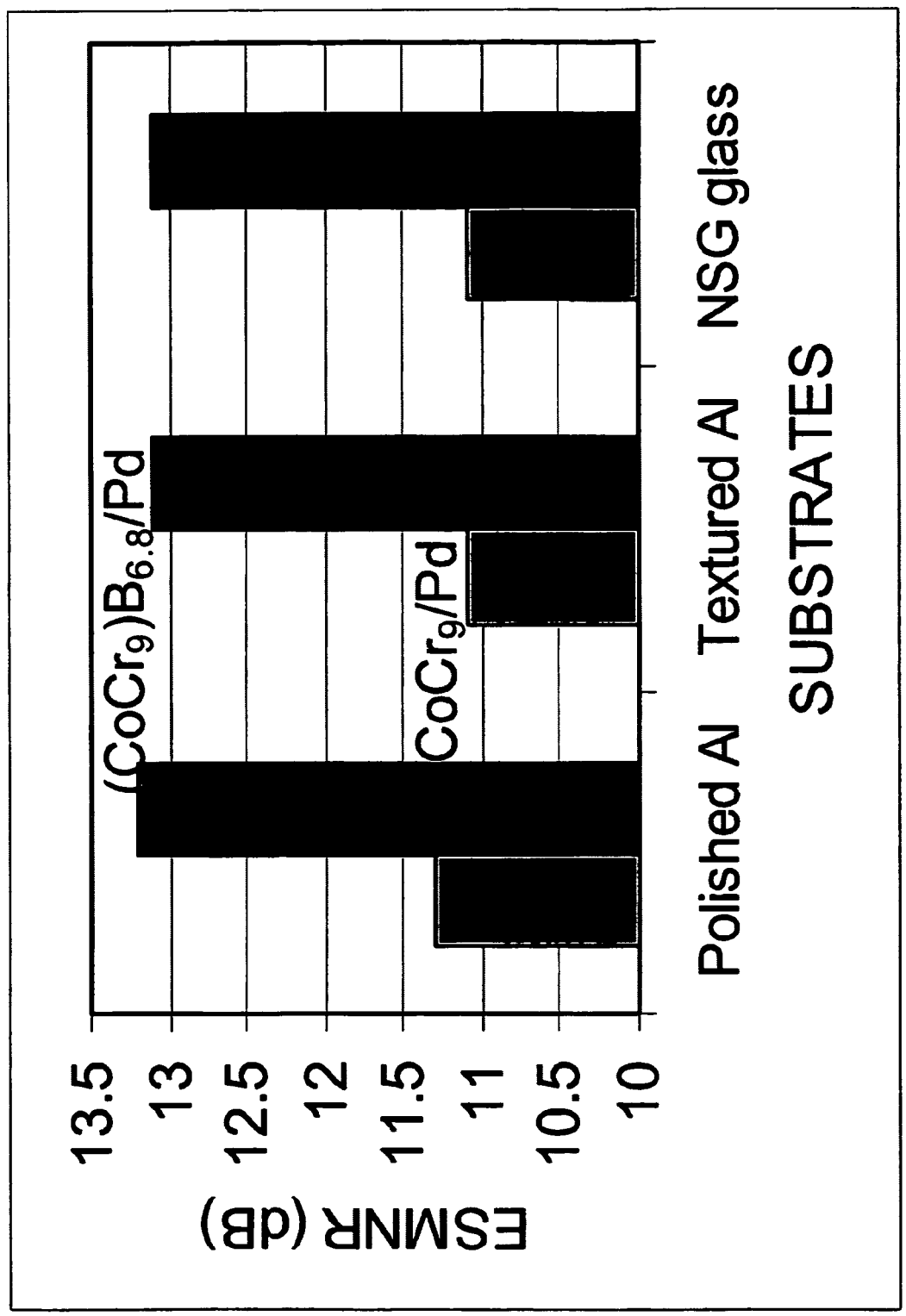
FIG. 9 is a bar graph comparing the SMNR of magnetic media structure 200 for on three kinds of substrates.

FIG. 9 is a bar graph comparing the SMNR of magnetic media structure 200 both with and without boron additives and for three different kinds of substrates 110. FIG. 9 illustrates the SMNR for CoCr/Pd deposited on polished NiP aluminum substrates, CoCr/Pd deposited on textured NiP aluminum substrates, CoCr/Pd deposited on Nipon Sheet Glass (NSG) glass substrates, CoCrB/Pd deposited on polished NiP aluminum substrates, CoCrB/Pd deposited on textured NiP aluminum substrates, and CoCrB/Pd deposited on Nipon Sheet Glass (NSG) glass substrates. The magnetic media structures 200 with boron additives have higher SMNR than the magnetic media structures 200 without boron additives for all three different substrates. FIG. 9 shows that the SMNR for magnetic media structure 200 having CoCrB/Pd deposited on all three substrates is about 13.2 dB while the SMNR for magnetic media structure 200 having CoCr/Pd deposited on all three substrates is about 11.2 dB.

Using high concentrations of boron or carbon additives in the CoCr alloy layer maintains sharp interfaces between the CoCr alloy layer and the Pd layer of perpendicular magnetic media structure 200. The high coercivity of the CoCr/Pd multilayer media with high-boron and high-carbon (more than 4 atomic percentage) additives is evidence of the sharp interfaces between CoCr and Pd films. The same effect is seen in the CoCr/Pt multilayers when high concentrations of boron or carbon are added. Additionally, other additives such as phosphorus and silicon can be used.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

We claim:

1. A magnetic recording medium, comprising:
   a substrate of a non-magnetic material;
   an underlayer comprising a plurality of layers of magnetically soft magnetic material separated by non-magnetic spacer layers, wherein said non-magnetic spacer layers comprise tantalum or surface-oxidized tantalum;
   a perpendicularly anisotropic first layer containing cobalt (Co), chromium (Cr), and boron (B) on said substrate; and
   a second layer consisting of palladium (Pd) or platinum (Pt) on said first layer to make a bi-layer, said bi-layer having a perpendicular magnetic anisotropy.

2. The magnetic recording medium, comprising:
   a substrate of a non-magnetic material;
   a first layer containing cobalt (Co), chromium (Cr), and carbon (C) deposited over said substrate; and
   a second layer comprising palladium (Pd) or platinum (Pt) deposited in contact with said first layer to make a bi-layer, said bi-layer having a perpendicular magnetic anisotropy,
   wherein said magnetic recording medium has an SMNR greater than 11.3 dB.

3. The magnetic recording medium of claim 2:
   wherein the magnetic recording medium comprises a plurality of said bi-layers consecutively stacked on top of each other.

4. The magnetic recording medium of claim 2 wherein said first layer further comprises 4 to 30 atomic percent of boron (B).

5. The magnetic recording medium of claim 2 wherein said magnetic recording medium has low noise having an SMNR greater than 11.3 dB.

6. The magnetic recording medium of claim 2, further comprising:
   a plurality of said bi-layers consecutively stacked on top of each other for producing a perpendicular magnetic recording medium with low noise.

7. The magnetic recording medium of claim 2, wherein said first layer comprises 4 to 30 atomic percent of carbon (C).

8. A magnetic recording medium, comprising:
   a substrate of a non-magnetic material;
   an underlayer comprising or a plurality of layers of magnetically soft magnetic material separated by non-magnetic spacer layers, wherein said non-magnetic spacer layers comprise tantalum or surface-oxidized tantalum;
   at least one non-magnetic interlayer; and
   a perpendicularly anisotropic recording layer comprising a first layer having cobalt, chromium, and an element selected from the group consisting of boron, silicon, and phosphorus,
   a second layer comprising palladium (Pd) or platinum (Pt) on said first layer to make a bi-layer, said bi-layer having a perpendicular magnetic anisotropy.

9. The magnetic recording medium of claim 8 wherein said magnetically soft magnetic material is comprised of cobalt, iron and boron.

10. The magnetic recording medium of claim 8 wherein said non-magnetic interlayer is a stack of Ta/ITO/CoCrRu/BOz/B.

11. The magnetic recording medium of claim 8 wherein said perpendicularly anisotropic recording layer is comprised of a superlattice structure having a plurality of alternating layers of CoCrB and Pd.

12. The magnetic recording medium of claim 8, wherein the element is boron.

13. A magnetic recording medium, comprising:
   a substrate of a non-magnetic material;
   an underlayer comprising a magnetically soft magnetic material or a plurality of layers of magnetically soft magnetic material separated by non-magnetic spacer layers;
   at least one non-magnetic interlayer; and
   a perpendicularly anisotropic recording layer comprised of a first layer having cobalt, chromium, and an element selected from the group consisting of silicon and phosphorus,
   a second layer consisting of palladium (Pd) or platinum (Pt) deposited in contact with said first layer to make a bi-layer, said bi-layer having a perpendicular magnetic anisotropy.

14. The magnetic recording medium of claim 1:
   wherein the magnetic recording medium comprises a plurality of said bi-layers consecutively stacked on top of each other.

15. The magnetic recording medium of claim 1 wherein said first layer comprises 4 to 30 atomic percent of boron (B).

16. The magnetic recording medium of claim 13:
   wherein the magnetic recording medium comprises a plurality of said bi-layers consecutively stacked on top of each other.

* * * * *